United States Patent
Kondo et al.

(10) Patent No.: US 8,224,554 B2
(45) Date of Patent: Jul. 17, 2012

(54) FUEL INJECTOR WITH BUILT-IN FUEL PRESSURE SENSOR

(75) Inventors: Jun Kondo, Nagoya (JP); Tooru Taguchi, Handa (JP)

(73) Assignee: Denso Corporation, Kariya (JP)

( * ) Notice: Subject to any disclaimer, the term of this patent is extended or adjusted under 35 U.S.C. 154(b) by 697 days.

(21) Appl. No.: 12/410,534

(22) Filed: Mar. 25, 2009

(65) Prior Publication Data

US 2009/0248276 A1 Oct. 1, 2009

(30) Foreign Application Priority Data

Mar. 28, 2008 (JP) ................................ 2008-086992

(51) Int. Cl.
 G06F 19/00 (2011.01)
 F02M 69/46 (2006.01)
 F02M 55/02 (2006.01)
 F02M 61/16 (2006.01)
(52) U.S. Cl. ................ 701/104; 239/533.12; 239/585.1; 123/456; 123/468
(58) Field of Classification Search .................. 123/434, 123/445–447, 456, 468, 472, 478, 480; 701/103–105; 239/88, 533.2, 533.7, 533.12, 239/585.1–585.5; 73/114.43
See application file for complete search history.

(56) References Cited

U.S. PATENT DOCUMENTS

| | | | |
|---|---|---|---|
| 6,718,946 B2 * | 4/2004 | Hokazono et al. | 123/445 |
| 6,729,297 B2 * | 5/2004 | Futonagane et al. | 123/299 |
| 7,210,459 B2 * | 5/2007 | Shibata | 123/456 |
| 7,963,155 B2 * | 6/2011 | Kondo et al. | 73/114.43 |
| 2006/0043209 A1 * | 3/2006 | Magel | 239/88 |
| 2009/0038373 A1 * | 2/2009 | Tomita et al. | 73/23.31 |
| 2011/0006130 A1 * | 1/2011 | Kondo et al. | 239/71 |

FOREIGN PATENT DOCUMENTS

| | | |
|---|---|---|
| EP | 1 925 803 | 5/2008 |
| JP | 04-346045 | 12/1992 |
| JP | 10-169524 | 6/1998 |
| JP | 11-013583 | 1/1999 |
| JP | 2000-265892 | 9/2000 |
| JP | 2005-320870 | 11/2005 |
| JP | 2006-300749 | 11/2006 |
| JP | 2008-144749 | 6/2008 |

OTHER PUBLICATIONS

Japanese Office Action dated Sep. 6, 2011, issued in corresponding Japanese Application No. 2008086992 with English Translation.

* cited by examiner

*Primary Examiner* — Willis Wolfe, Jr.
(74) *Attorney, Agent, or Firm* — Nixon & Vanderhye PC

(57) ABSTRACT

A fuel injector for an internal combustion engine is provided which has a fuel supply path and a nozzle chamber. The fuel supply path extends a spray hole. The nozzle chamber is defined in the fuel supply path. A nozzle is disposed within the nozzle chamber to establish or block a fluid communication between the fuel supply path and the spray hole. A fuel pressure sensor is installed in the fuel injector so as to be exposed to the fuel in the nozzle chamber. Specifically, the fuel pressure sensor is located closer to the spray hole than a prior art structure in which the fuel pressure sensor is installed in a fuel supply pipe, thus resulting in increased accuracy in measuring a change in pressure of the fuel arising from the spraying of the fuel from the spray hole.

6 Claims, 3 Drawing Sheets

FUEL INJECTOR WITH BUILT-IN FUEL PRESSURE SENSOR

CROSS REFERENCE TO RELATED DOCUMENT

The present application claims the benefit of Japanese Patent Application No. 2008-86992 filed on Mar. 28, 2008, the disclosures of which are incorporated herein by reference.

BACKGROUND OF THE INVENTION

1. Technical Field of the Invention

The present invention relates generally to a fuel injector to be installed in an internal combustion engine to spray fuel thereinto, and more particularly to such a fuel injector which has installed therein a fuel pressure sensor working to measure a change in pressure of fuel arising from the spraying of the fuel into the engine accurately.

2. Background Art

In order to ensure the accuracy in controlling output torque of internal combustion engines and the quantity of exhaust emissions therefrom, it is essential to control a fuel injection mode such as the quantity of fuel to be sprayed from a fuel injector or the injection timing at which the fuel injector starts to spray the fuel. For controlling such a fuel injection mode, there have been proposed techniques for monitoring a change in pressure of the fuel upon spraying thereof from the fuel injector.

Specifically, the time when the pressure of the fuel begins to drop due to the spraying thereof from the fuel injector may be used to determine an actual injection timing at which the fuel has been sprayed actually. The amount of drop in pressure of the fuel arising from the spraying thereof may be used to determine the quantity of fuel sprayed actually from the fuel injector. Such actual observation of the fuel injection mode ensures the desired accuracy in controlling the fuel injection mode.

For instance, in the case where a change in pressure of the fuel arising from the spraying of the fuel from the fuel injector (which will also be referred to as a fuel pressure change below) is measured using a fuel pressure sensor installed directly in a common rail (i.e., a fuel accumulator), it will be somewhat absorbed within the common rail, thus resulting in a decrease in accuracy in determining such a pressure change. In order to alleviate this drawback, Japanese Patent First Publication No. 2000-265892 teaches installation of the fuel pressure sensor in a joint between the common rail and a high-pressure pipe through which the fuel is delivered from the common rail to the fuel injector to measure the fuel pressure change before it is absorbed within the common rail.

The fuel pressure change, however, usually somewhat attenuates in the high-pressure pipe. The fuel pressure sensor, as disclosed in the above publication, disposed in the joint between the common rail and the high-pressure pipe is, therefore, insufficient to satisfy the required accuracy of determining the fuel pressure change.

SUMMARY OF THE INVENTION

It is therefore a principal object of the invention to avoid the disadvantages of the prior art.

It is another object of the invention to provide a fuel injector with a built-in fuel pressure sensor designed to measure a change in pressure of fuel arising from the spraying of the fuel from the fuel injector.

According to one aspect of the present invention, there is provided a fuel injector which may be employed in spraying fuel into an automotive internal combustion engine such as a diesel engine. The fuel injector comprises: (a) a body having a fuel inlet and a spray hole formed therein the body also having formed therein a fuel supply path which extends from the fuel inlet to the spray hole and through which the fuel is supplied from the fuel inlet to the spray hole; (b) a nozzle chamber defined in the fuel supply path, the nozzle chamber being greater in cross sectional area than the fuel supply path; (c) a nozzle disposed within the nozzle chamber to be movable into or out of abutment with a seat formed on the body to block or establish fluid communication between the fuel supply path and the spray hole; and (d) a fuel pressure sensor installed in the body so as to be exposed to the fuel in the nozzle chamber to produce a signal indicative of a pressure of the fuel.

Specifically, the fuel pressure sensor is built in the fuel injector. In other words, the fuel pressure sensor is located closer to the spray hole than the prior art structure, as disclosed in the above publication, thus resulting in increased accuracy in measuring a change in pressure of the fuel arising from the spraying of the fuel from the spray hole.

In the preferred mode of the invention, the fuel injector further comprises a signal wire which is joined to the fuel pressure sensor and through which the signal, as produced by the fuel pressure sensor, is outputted outside the body and a fuel drain path through which a portion of the fuel is drained outside the body at a pressure lower than that in the fuel supply path. The signal wire is disposed in the fuel drain path. This permits a hermetical seal required to avoid the leakage of the fuel from a wire outlet hole to be achieved by a simple structure because it is required merely to avoid the leakage of the low-pressure fuel.

The fuel injector further include a sensor mounting member that is a portion of the body and has formed therein a mount hole in which the fuel pressure sensor is retained, a signal wire through which the signal, as produced by the fuel pressure sensor, is outputted outside the body, a hermetical seal provided in a fuel leakage path which extends through between the fuel pressure sensor and the mount hole of the sensor mounting member and through which the fuel, having flowed into the body through the fuel supply path, is to leak. The signal wire is joined to a portion of the fuel pressure sensor which is located downstream of the hermetical seal in the fuel leakage path.

The fuel pressure sensor may be equipped with a piezoelectric device which is subjected to the pressure of the fuel in the nozzle chamber to produce the signal indicative thereof.

The fuel pressure sensor may be equipped with a temperature sensor working to produce a signal indicative of a temperature of the fuel pressure sensor for compensating for a temperature-dependent error of an output of the fuel pressure sensor.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
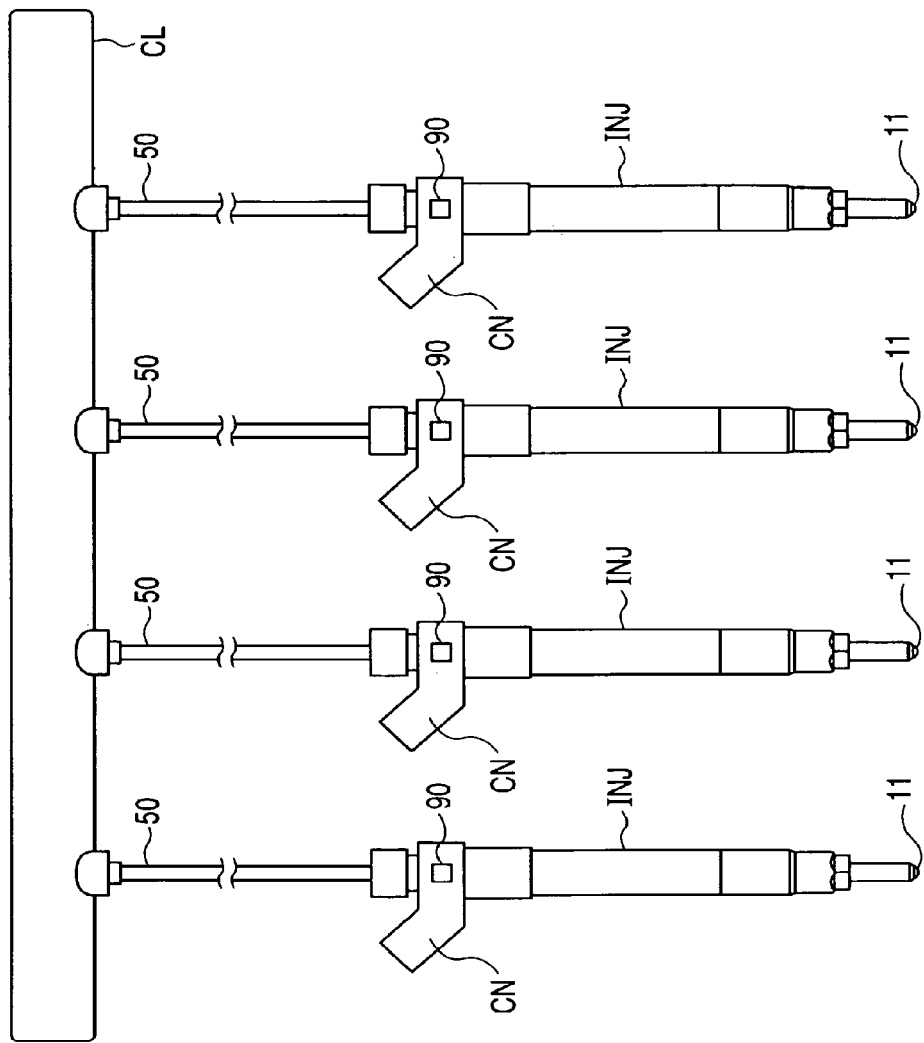
FIG. 1 is a schematic view which shows fuel injectors joined to a common rail according to the invention.
Figure 2:
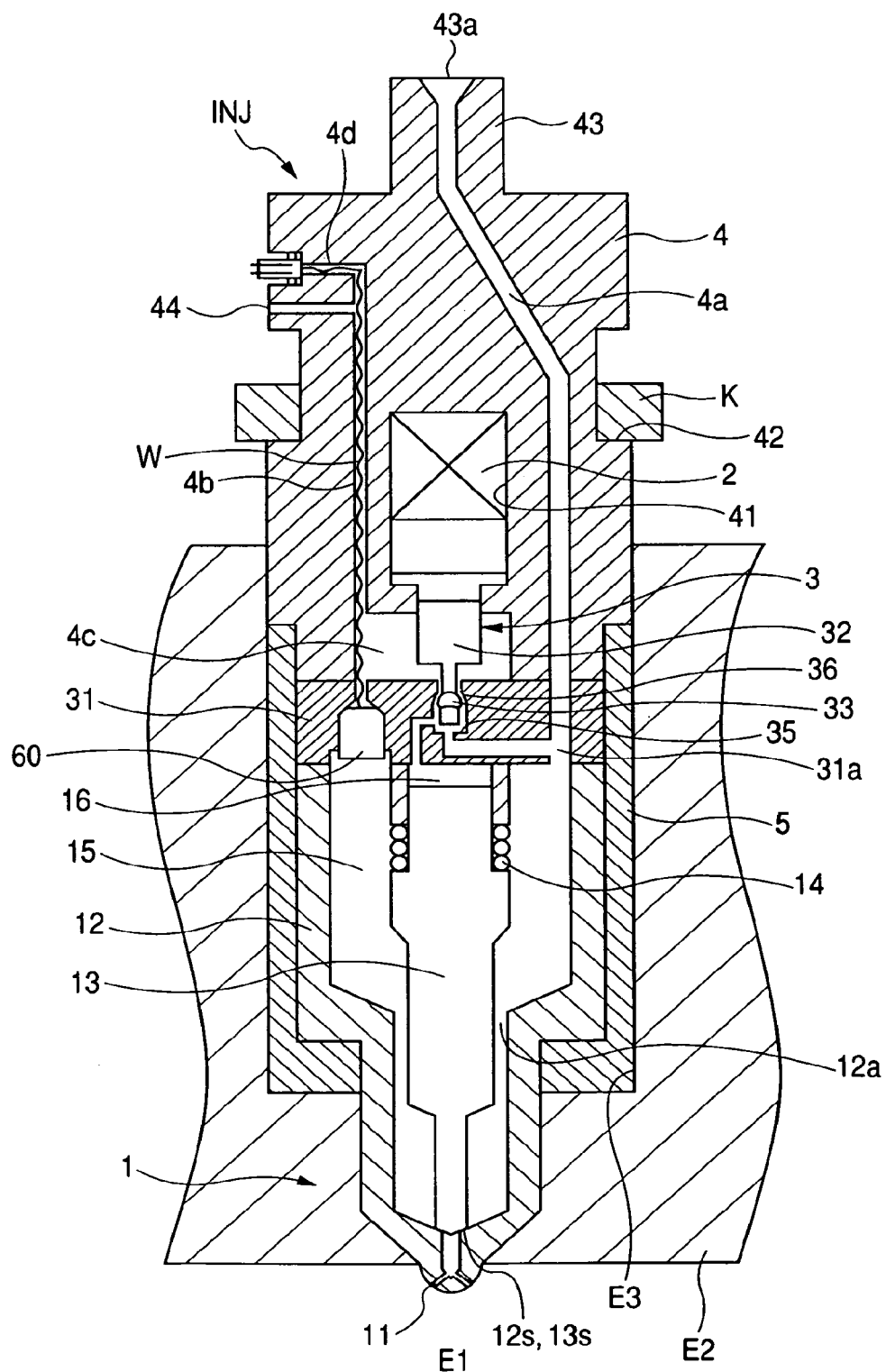
FIG. 2 is a longitudinal sectional view which shows an internal structure of each of the fuel injectors of FIG. 1.
Figure 3:
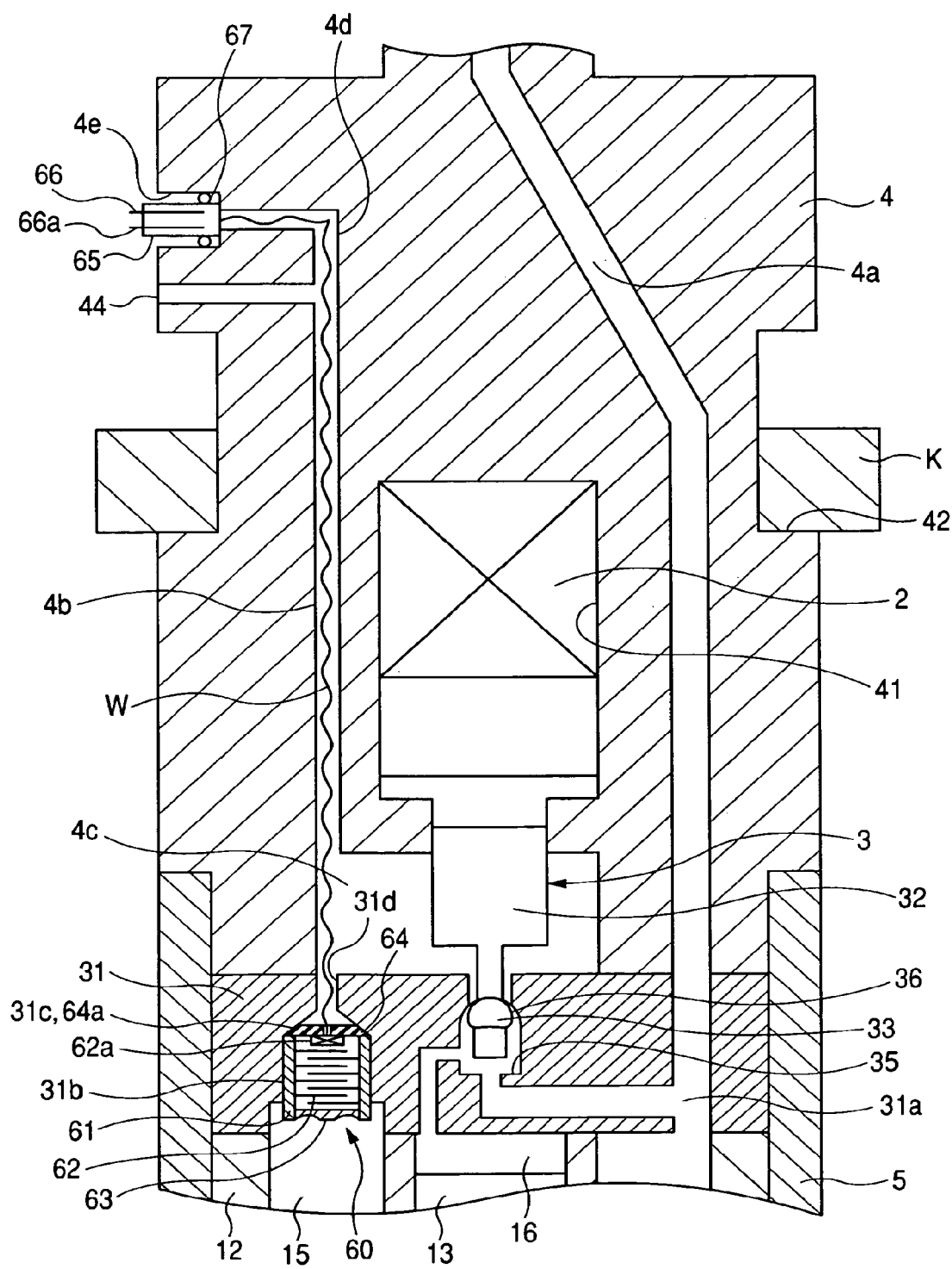
FIG. 3 is a partially enlarged view of FIG. 2.

Referring to the drawings, wherein like reference numbers refer to like parts in several views, particularly to FIG. 1, there is shown fuel injectors INJ according to the invention which are joined to a common rail CL (i.e., a fuel accumulator), as usually used in an automotive fuel injection system. FIG. 2 is a longitudinal sectional view which shows an internal structure of each of the injectors INJ. FIG. 3 is an enlarged view of FIG. 2.

Each of the injectors INJ, as illustrated in FIGS. 1 and 2, works to spray the fuel, as supplied from the common rail CL, into a corresponding one of combustion chambers E1 of the internal combustion engine. The injectors INJ are installed in a cylinder head E2 of the engine.

The engine, as referred to herein, is an automotive in-line four-cylinder four-stroke reciprocating diesel engine in which high-pressure light fuel is to be injected directly into the combustion chamber E1 at an atmospheric pressure of 1000 or more. The common rail CL serves as a fuel accumulator which is supplied with the high-pressure fuel, as fed from a fuel tank through a fuel pump (not shown).

The injector INJ includes a nozzle 1, a piezo actuator 2, and a back pressure control mechanism 3. The piezo actuator 2 is equipped with a piezoelectric device which expands or contracts when charged or discharged to open or close the nozzle 1. The back pressure control mechanism 3 is driven by the piezo actuator 2 to control the back pressure acting on the nozzle 1. Instead of the piezo actuator 2, a solenoid coil may be employed to actuate the back pressure control mechanism 3. Alternatively, in place of the back pressure control mechanism 3, the injector INJ may be designed as a direct-acting fuel injector in which an actuator opens or closes the nozzle 1 directly.

The nozzle 1 is made up of a nozzle body 12 in which spray holes 11 are formed, a needle 13, and a spring 14. The needle 13 is to be moved into or out of abutment with a seat 12s formed on an inner wall of the nozzle body 12 to close or open the spray holes 11. Specifically, when the needle 13 is placed at a conical head 13s thereof on the seat 12s, it blocks a fluid communication between a high-pressure fuel path 12a and the spray holes 11. Alternatively, when the head 13s of the needle 13 is moved away from the seat 12s, it establishes the fluid communication between the high-pressure fuel path 12a and the spray holes 11. The spring 14 urges the needle 13 in a valve-closing direction in which the spray holes 11 are closed.

The piezo actuator 2 is made of a stack of piezoelectric elements (which is usually called a piezo stack). The piezoelectric elements are capacitive loads which expand or contact through the piezoelectric effect. When charged, the piezo stack expands, while when discharged, the piezo stack contacts. Specifically, the piezo stack serves as an actuator to move the needle 13. The piezo actuator 2 is supplied with electric power from conductors (not shown) joined to an electric connector CN, as illustrated in FIG. 1.

The back pressure control mechanism 3 includes a valve body 31 which has formed therein an inner fluid path in which a head portion of a piston 32 and a ball valve 33 are disposed. The piston 32 is moved by the contraction or expansion of the piezo actuator 2 to lift up or down the ball valve 33. The valve body 31 is illustrated as being made of a single member, but actually formed by a plurality of blocks.

The injector INJ also includes a cylindrical injector body 4 which has formed therein a cylindrical inner chamber 41 extending substantially in an axial or longitudinal direction of the injector INJ (i.e., a vertical direction, as viewed in FIG. 2).

The inner chamber 41 has a lower end, as viewed in the drawing, defined by an inner annular shoulder (or flange) of the injector body 4. The piezo actuator 2 and the back pressure control mechanism 3 are disposed in the inner chamber 41. A hollow cylindrical retainer 5 is threadably fitted to the injector body 4 to secure the nozzle 1 to the end of the injector body 4.

The injector body 4, the valve body 31, and the nozzle body 12 have formed therein high-pressure fuel paths 4a, 31a, and 12a which define a fuel flow path into which the fuel is delivered at a high pressure from the common rail CL at all times. The injector body 4 and the valve body 31 have formed therein a low-pressure fuel path 4b leading to the fuel tank (not shown). An assembly of the injector body 4, the valve body 31, and the nozzle body 12 defines a body of each of the fuel injectors INJ.

The injector body 4 has formed therein a piston chamber 4c that is the part of the low-pressure fuel path 4b and greater in diameter than the low-pressure fuel path 4b. The piston 32 is disposed in the piston chamber 4c. In other words, the outer periphery of the piston 32 and the inner periphery of the injector body 4 define the part of the low-pressure fuel path 4b.

The nozzle body 12, the injector body 4, and the valve body 31 are each made of metal and installed in a mount hole E3 formed in a cylinder head E2 of the engine. The injector body 4 has an outer shoulder 42 with which an end of a clamp K is to engage for securing the fuel injector INJ in the mount hole E3 tightly Specifically, installation of the fuel injector INJ in the mount hole E3 is achieved by fastening the other end of the clamp K to the cylinder head E2 through a bolt to press the outer shoulder 42 into the mount hole E3.

The nozzle body 12 has formed therein a nozzle chamber 15 that constitutes the part of the fuel supply path defined by the high-pressure fuel paths 4a, 31a, and 12a and greater in diameter or cross sectional area than the fuel supply path. In other words, the outer periphery of the needle 13 and the inner periphery of the nozzle body 12 define the part of the high-pressure fuel path 12a. When the needle 13 is moved in a valve-opening direction, it establishes a fluid communication between the nozzle chamber 15 and the spray holes 11. The nozzle chamber 15 is supplied with the high-pressure fuel at all the time through the high-pressure fuel path 31a. A back-pressure chamber 16 is formed by one of ends of the needle 13 which is opposite the spray holes 11. The spring 14 is disposed within the back-pressure chamber 16 to urge the needle 13 in a valve-closing direction.

The valve body 31 defines the piston chamber 4c and the nozzle chamber 15 separately. The valve body 31 has formed therein a high-pressure seat 35 exposed to a fluid path extending between the high-pressure fuel path 31a and the back-pressure chamber 16. The valve body 31 has also formed therein a low-pressure seat 36 exposed to a path extending between the low-pressure fuel path 4b and the back-pressure chamber 16 in the nozzle 1. The low-pressure seat 36 faces the high-pressure seat 35 to define a valve chamber within which the ball valve 33 is disposed.

The injector body 4 has a high-pressure port 43 in which a fuel inlet 43a is formed and to which a high-pressure pipe 50 is to be joined, as illustrated in FIG. 1, and a low-pressure port 44 to which a low-pressure pipe (i.e., a drain pipe) is to be connected. The high-pressure port 43 is, as illustrated in FIG. 2, located farther away from the spray holes 11 than the clamp K, but may be located closer to the spray holes 11 than the clamp K. The high-pressure port 43 extends from the axial end of the injector body 4, but may be formed on a side wall of the injector body 4.

In operation, the fuel, as stored in the common rail CL at a high pressure, is delivered from outlets of the common rail CL and supplied to the high-pressure ports 43 of the fuel injectors INJ through the high-pressure fuel pipes 50. The fuel then passes through the high-pressure fuel paths 4a and 31a and enters the nozzle chamber 15 and the back pressure chamber 16. When the piezoelectric actuator 2 is in a contracted state, the valve 33 is, as illustrated in FIG. 2, urged into abutment with the low-pressure seat 36 to establish the fluid communication between the back-pressure chamber 16 and the high-pressure fuel path 31a, so that the high-pressure fuel is supplied to the back-pressure chamber 16. The pressure of the fuel in the back-pressure chamber 16 and the elastic pressure, as produced by the spring 14, act on the needle 13 to urge it in the valve-closing direction to close the spray holes 11.

Alternatively, when the piezoelectric actuator 2 is charged so that it expands, the valve 33 is pushed into abutment with the high-pressure seat 35 to establish the fluid communication between the back-pressure chamber 16 and the low-pressure fuel path 4b, so that the pressure in the back-pressure chamber 16 drops, thereby causing the needle 13 to be urged by the pressure of fuel in the nozzle chamber 15 in the valve-opening direction to open the spray holes 11 to spray the fuel into the combustion chamber E1 of the engine.

A sequence of steps of joining the fuel injectors INJ and the high-pressure fuel pipes 50 to the cylinder head E2 will be described below.

First, the fuel injector INJ is inserted into the mount hole E3 of the cylinder head E2. The bolt is fastened to secure the clamp K to the cylinder head E2 to fix the injector INJ in the cylinder head E2 firmly. Next, the high-pressure fuel pipe 50 is joined to the high-pressure port 43 of the injector INJ. After all the injectors INJ are mounted in the cylinder head E2, and the high-pressure fuel pipes 50 are joined to all the injectors INJ, the high-pressure fuel pipes 50 are connected to the common rail CL.

The spraying of the fuel from the spray holes 11 of each of the fuel injectors INJ will result in a variation in pressure of the fuel in the injector INJ. Fuel pressure sensors 60 working to monitor such a fuel variation are installed, one in each of the fuel injectors INJ. The time when the fuel has started to be sprayed actually from the injector INJ may be found by sampling the time when the pressure of fuel has started to drop from the waveform of an output from the fuel pressure sensor 60. The time when the fuel has stopped from being sprayed actually from the injector INJ may be found by sampling the time when the pressure of fuel has started to rise from the waveform of the output from the fuel pressure sensor 60. The quantity of fuel having been sprayed from the injector INJ may be found by sampling the amount by which the fuel has dropped from the waveform of the output of the fuel pressure sensor 60. In other words, each of the fuel pressure sensors 60 works to detect a change in injection rate arising from the spraying of fuel from a corresponding one of the fuel injectors INJ.

Next, the structure of the fuel injector INJ in which the fuel pressure sensor 60 is installed will be described below with reference to FIG. 3.

The valve body 31 separating the piston chamber 4c and the nozzle chamber 15 from each other has a mount hole 31b formed in the end wall facing the nozzle chamber 15. The fuel pressure sensor 60 is retained firmly in the mount hole 31b. The valve body 31 also has a wire outlet hole 31d formed in the end wall facing the piston chamber 4c. The wire outlet hole 31d communicates with the mount hole 31b. Conductive wires W joined to the fuel pressure sensor 60 pass through the wire outlet hole 31d and extend into the piston chamber 4c.

The fuel pressure sensor 60 is made up of a hollow cylindrical casing 61, a stack of piezoelectric devices 62 retained inside the casing 61, a bellows 63 fit in and closing one of opposed openings of the casing 61, a seal 64 fit in and closing the other of the openings of the casing 61, and a temperature sensor device 62a disposed inside the casing 61. The bellows 63 is exposed to the nozzle chamber 15 and subjected to the pressure of fuel in the nozzle chamber 15, so that it deforms in an axial direction of the casing 61 (i.e., a vertical direction, as viewed in the drawing). The bellows 63 is located outside the mount hole 31b, but may alternatively be disposed inside the mount hole 31b as long as it is exposed directly to the fuel.

The piezoelectric devices 62 are laid to overlap each other in the axial direction of the casing 61 and will also be referred to as a piezo stack 62 below. The pressure of fuel is transmitted to the piezo stack 62 through the bellows 63, so that the piezo stack 62 produces an electromotive force as a function of the pressure of fuel and outputs it in the form of an electric signal outside the fuel pressure sensor 60 through the conductive wire W. The signal outputted from the fuel pressure sensor 60 is transmitted to, for example, an engine ECU (Electronic Control Unit) installed in an automotive vehicle.

The temperature sensor device 62a works to measure the temperature of the fuel pressure sensor 60. The temperature sensor device 62a may be made of a temperature measuring semiconductor device such as a diode. An output of the temperature sensor device 62a is transmitted to, for example, the engine ECU through the wire conductor W.

The seal 64 is of a disc shape and has a sealing surface 64a. The seal 64 is disposed within the mount hole 311b so that it is deformed elastically under pressure in abutment with a conical sealing surface 31c of the valve body 31 to create a hermetical seal between the fuel pressure sensor 60 and the valve body 31 to avoid the leakage of fuel from the nozzle chamber 15 to the piston chamber 4c through a clearance between the outer periphery of the casing 61 and the mount hole 31b and the wire outlet hole 31d.

The conductive wires W of the fuel pressure sensor 60 pass through a center hole formed in the seal 64 (i.e., inside the annular sealing surface 64a) and extend from the valve body 31 to the piston chamber 4c through the wire outlet hole 31d. The injector body 4 has formed in an upper peripheral wall thereof a wire outlet bore 4e within which a connector housing 65 is retained. The connector housing 65 has terminals 66 and 66a joined to the conductive wires W. The injector body 4 has also formed therein a wire path 4d diverging from a bend of the low-pressure fuel path 4b. The conductive wires W extend through the low-pressure fuel path 4b and the branch path 4d and connect with the terminals 66 and 66a in the connector housing 65.

Specifically, the conductive wires W extend from inside to outside the injector body 4 through the low-pressure fuel path 4b. More specifically, the conductive wires W extend through the injector body 4 in a lengthwise or axial direction of the fuel injector INJ, are bent at substantially right angles, and connect with the connector housing 65 fit in the wire outlet bore 4e formed in an upper side wall of the injector body 4. The connector housing 65 is located opposite the spray holes 11 across the piezo actuator 2 and the low-pressure port 44.

The terminal 66 from which the signal indicating the pressure of fuel, as measured by the piezo stack 62, is outputted and the terminal 66a from which the signal indicating the temperature of the fuel pressure sensor 60, as measured by the temperature sensor device 62a, is outputted are disposed in the connector housing 65. In other words, the connector housing 65 is shared with the fuel pressure sensor 60 and the temperature sensor device 62a. A seal 67 such as an O-ring is interposed between the connector housing 65 and the wire outlet bore 4e of the injector body 4 to create a hermetical seal to avoid the leakage of fuel from a clearance between the outer periphery of the connector housing 65 and the wire outlet bore 4e to outside the injector body 4.

Usually, the output of the piezo stack 63 (i.e., the fuel pressure sensor 60) changes with a change in temperature of the fuel pressure sensor 60 regardless of the pressure of fuel in the nozzle chamber 15. It is, thus, preferable to correct the output of the fuel pressure sensor 60 based on the output of the temperature sensor device 62a. Each of the fuel injectors INJ, as can be seen in FIG. 1, has affixed thereto a QR code 90 (registered trade name) that is an optically readable two-dimensional code representing a temperature characteristic of the fuel injector INJ. The temperature characteristic is expressed by, for example, a relation between the output of the fuel pressure sensor 60 and the temperature of the fuel pressure sensor 60 which may be experimentally derived by feeding fuel whose temperature is set to a selected value to the nozzle chamber 15 at a selected pressure, then sampling the output from the fuel pressure sensor 60, and repeating these steps for each of selected temperature ranges.

The QR code 90 on each of the fuel injectors INJ is read by a scanner to acquire the temperature characteristic. The temperature characteristics are inputted and stored, one for each of the fuel injectors INJ, in the engine ECU working to control operations of the fuel injectors INJ, for example, at the automobile factory. The engine ECU compares between the temperature characteristic and the output from the temperature sensor device 62a of a corresponding one of the fuel injectors INJ mounted in the engine and corrects the output from the piezo stack 62 of the one of the fuel injectors INJ so as to compensate for a temperature-dependent difference between an actual pressure of fuel in the nozzle chamber 15 and the output of the fuel pressure sensor 60.

The engine ECU also works to minimize an error in output from each of the fuel pressure sensors 60 arising from an individual variability of the fuel pressure sensors 60. Specifically, the QR code affixed to each of the fuel injectors INJ also has data on a fuel pressure characteristic which is expressed by, for example, a relation between the output of the fuel pressure sensor 60 and an actual pressure of fuel in the nozzle chamber 15 which may be experimentally derived by feeding fuel to the nozzle chamber 15 at a selected pressure, then sampling the output from the fuel pressure sensor 60, and repeating these steps for each of selected pressure ranges.

Like the temperature characteristic, the QR code 90 on each of the fuel injectors INJ is read by the scanner to acquire the fuel pressure characteristic. The fuel pressure characteristics are inputted and stored, one for each of the fuel injectors INJ, in the engine ECU at the automobile factory. The engine ECU compares between the fuel pressure characteristic and the output from the fuel pressure sensor 60 of a corresponding one of the fuel injectors INJ mounted in the engine and corrects the output from the fuel pressure sensor 60 of the one of the fuel injectors INJ so as to compensate for a sensor individual variability dependent difference between an actual pressure of fuel in the nozzle chamber 15 and the output of the fuel pressure sensor 60.

The above described structure of the fuel injectors INJ offers the following beneficial effects.

1) The fuel pressure sensor 60 is retained in the valve body 31 and exposed to the fuel within the nozzle chamber 15. Specifically, the fuel pressure sensor 60 is located closer to the spray holes 11 than when the fuel pressure sensor 60 is installed in the high-pressure port 43, thus resulting in increased accuracy in measuring a change in pressure of the fuel arising from the spraying of the fuel from the spray holes 11.

2) The conductive wires W of the fuel pressure sensor 60 are arrayed in the piston chamber 4c and the low-pressure fuel path 4b. This permits the hermetical seal required between the inner periphery of the wire outlet bore 4e and the outer periphery of the connector housing 65 to be achieved by a simple structure because it is required merely to avoid the leakage of the low-pressure fuel to outside the injector body 4. Even if the fuel leaks from the nozzle chamber 15 through the hermetical sealing in the wire outlet hole 31d, it is drained only to the fuel tank through the low-pressure fuel path 4b, thus eliminating the need for increasing the degree of the hermetical sealing.

3) The conductive wires W extend outside the casing 61 of the fuel pressure sensor 60 through the center hole formed inside the sealing surface 64a of the seal 64. Specifically, the conductive wires W extend from the fuel pressure sensor 60 downstream of the sealing surface 64a in a fuel leakage path along which the fuel might leak from the nozzle chamber 15 to the piston chamber 4c. Use of the seal 64 disposed between the casing 61 of the fuel pressure sensor 60 and the valve body 31, therefore, eliminates the need for hermetical sealing between the conductive wires W and the valve body 31.

4) The temperature characteristic, as derived experimentally, is stored in the QR code 90 affixed to each of the fuel injectors INJ for correcting an output from the piezo stack 62 to compensate for a temperature-dependent error of the output, thus resulting in improvement of accuracy in measuring a change in pressure of the fuel in the fuel injector INJ.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

The fuel pressure sensor 60 may alternatively be installed in the nozzle body 12 in which the needle 13 is disposed. When the fuel injector INJ is retained in the cylinder head E2, the fuel pressure sensor 60 is, as clearly illustrated in FIG. 2, located inside the mount hole E3 of the cylinder head E2, but however, it may alternatively be retained in a portion of the fuel injector INJ which is outside the mount hole E3 as long as the fuel pressure sensor 60 is exposed to the fuel in the nozzle chamber 15.

Instead of the temperature sensor device 62a installed in the fuel pressure sensor 60, another temperature sensor may be used to measure the temperature of fuel for compensating for the temperature-dependent error of the output of the fuel pressure sensor 60 because the temperature of the fuel usually has a high correlation to that of the fuel pressure sensor 60. For example, the temperature sensor may be installed in the high-pressure fuel pipe 50 or the common rail CL as well as within the fuel injector INJ.

Each of the fuel pressure sensors 60 may alternatively be equipped with a strain gauge instead of the piezo stack 62. For example, a stem which is elastically deformable in response to the pressure of fuel in the nozzle chamber 15 is provided in the fuel pressure sensor 60. The stain gauge is affixed to the stem to produce an electric signal as a function of the degree of deformation of the stem.

The connector housing 65 for the fuel pressure sensor 60 is separate from the electric connector CN, but however, the terminals 66 and 66a may be disposed inside the electric connector CN.

The conductive wires W are disposed inside the low-pressure fuel path 4b, however, may extend through the valve body 31 and the injector body 4 in a lateral or radial direction of the fuel injector INJ so that they emerge from the outer circumferential wall of the injector body 4.

The body of the fuel injectors INJ is made up of three parts: the injector body 4 in which the high-pressure fuel path 4a extends, the valve body 31 in which the high-pressure fuel path 31a extends, and the nozzle body 12 in which the high-pressure fuel path 12a extends, however, it may be made of two or four or more parts.

The invention may alternatively be used with fuel injectors to be installed in gasoline engines such as direct injection gasoline engines designed to inject the fuel directly into the combustion chambers E1 of the engine.

What is claimed is:

1. A fuel injector which is to be installed in an internal combustion engine to spray fuel from a spray hole comprising:
    a body having a fuel inlet and a spray hole formed therein said body also having formed therein a fuel supply path which extends from the fuel inlet to the spray hole and through which the fuel is supplied from the fuel inlet to the spray hole;
    a nozzle chamber defined in the fuel supply path, said nozzle chamber being greater in cross sectional area than the fuel supply path;
    a nozzle disposed within said nozzle chamber to be movable into or out of abutment with a seat formed on said body to block or establish fluid communication between the fuel supply path and the spray hole;
    a fuel pressure sensor installed in said body so as to be exposed to the fuel in said nozzle chamber to produce a signal indicative of a pressure of the fuel; and
    a signal wire which is joined to said fuel pressure sensor and through which the signal, as produced by said fuel pressure sensor, is outputted outside said body and a fuel drain path through which a portion of the fuel is drained outside said body at a pressure lower than that in said fuel supply path, and wherein said signal wire is disposed in said fuel drain path.

2. A fuel injector which is to be installed in an internal combustion engine to spray fuel from a spray hole comprising:
    a body having a fuel inlet and a spray hole formed therein said body also having formed therein a fuel supply path which extends from the fuel inlet to the spray hole and through which the fuel is supplied from the fuel inlet to the spray hole;
    a nozzle chamber defined in the fuel supply path, said nozzle chamber being greater in cross sectional area than the fuel supply path;
    a nozzle disposed within said nozzle chamber to be movable into or out of abutment with a seat formed on said body to block or establish fluid communication between the fuel supply path and the spray hole;
    a fuel pressure sensor installed in said body so as to be exposed to the fuel in said nozzle chamber to produce a signal indicative of a pressure of the fuel,
    wherein said fuel pressure sensor is equipped with a temperature sensor working to produce a signal indicative of a temperature of said fuel pressure sensor.

3. A fuel injector which is to be installed in an internal combustion engine to spray fuel from a spray hole comprising:
    a body having a fuel inlet and a spray hole formed therein said body also having formed therein a fuel supply path which extends from the fuel inlet to the spray hole and through which the fuel is supplied from the fuel inlet to the spray hole;
    a nozzle chamber defined in the fuel supply path, said nozzle chamber being greater in cross sectional area than the fuel supply path;
    a nozzle disposed within said nozzle chamber to be movable into or out of abutment with a seat formed on said body to block or establish fluid communication between the fuel supply path and the spray hole;
    a fuel pressure sensor installed in said body so as to be exposed to the fuel in said nozzle chamber to produce a signal indicative of a pressure of the fuel; and
    a sensor mounting member that is a portion of said body and has formed therein a mount hole in which said fuel pressure sensor is retained, a signal wire through which the signal, as produced by said fuel pressure sensor, is outputted outside said body, a hermetical seal provided in a fuel leakage path which extends through between said fuel pressure sensor and the mount hole of said sensor mounting member and through which the fuel, having flowed into said body through the fuel supply path, is to leak, and wherein said signal wire is joined to a portion of said fuel pressure sensor which is located upstream of said hermetical seal in the fuel leakage path.

4. A fuel injector as set forth in claim 3, further comprising a signal wire which is joined to said fuel pressure sensor and through which the signal, as produced by said fuel pressure sensor, is outputted outside said body and a fuel drain path through which a portion of the fuel is drained outside said body at a pressure lower than that in said fuel supply path, and wherein said signal wire is disposed in said fuel drain path.

5. A fuel injector as set forth in claim 3, wherein said fuel pressure sensor is equipped with a piezoelectric device which is subjected to the pressure of the fuel in said nozzle chamber to produce the signal indicative thereof.

6. A fuel injector as set forth in claim 3, wherein said fuel pressure sensor is equipped with a temperature sensor working to produce a signal indicative of a temperature of said fuel pressure sensor.

* * * * *